May 5, 1931.  A. SCHMIDT ET AL  1,803,773
ROTARY VALVE
Filed Aug. 9, 1929  3 Sheets-Sheet 1

Inventors:
A. Schmidt &
E. Haselhorst
By: Marks & Clerk
Attys.

May 5, 1931.  A. SCHMIDT ET AL  1,803,773
ROTARY VALVE
Filed Aug. 9, 1929     3 Sheets-Sheet 2
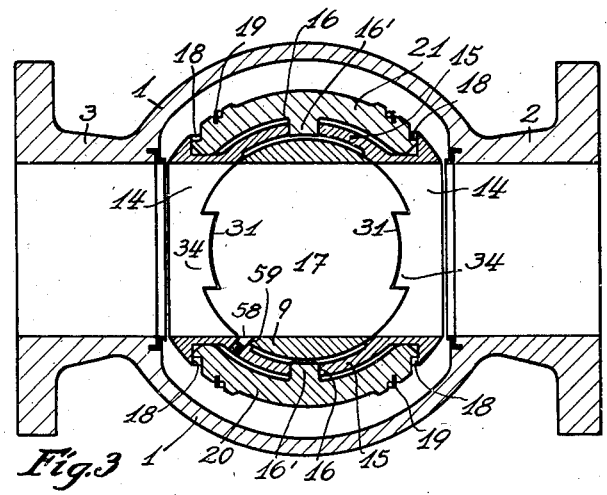
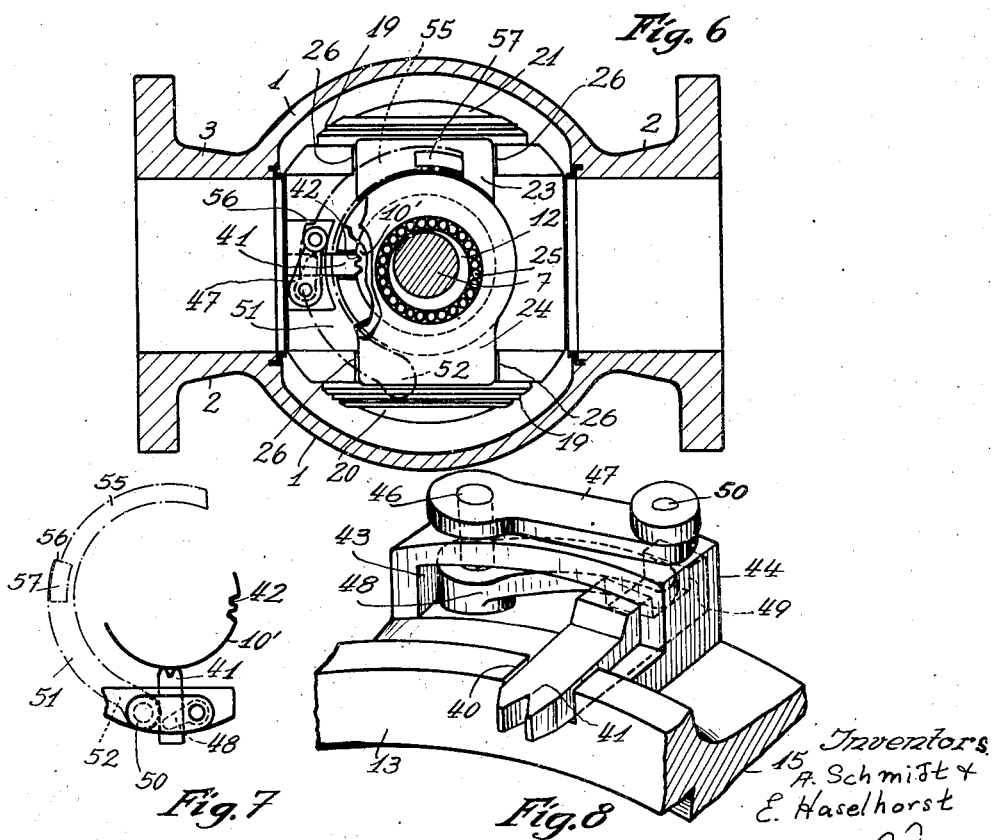
Inventors
A. Schmidt &
E. Haselhorst
By Marks & Clerk
Attys.

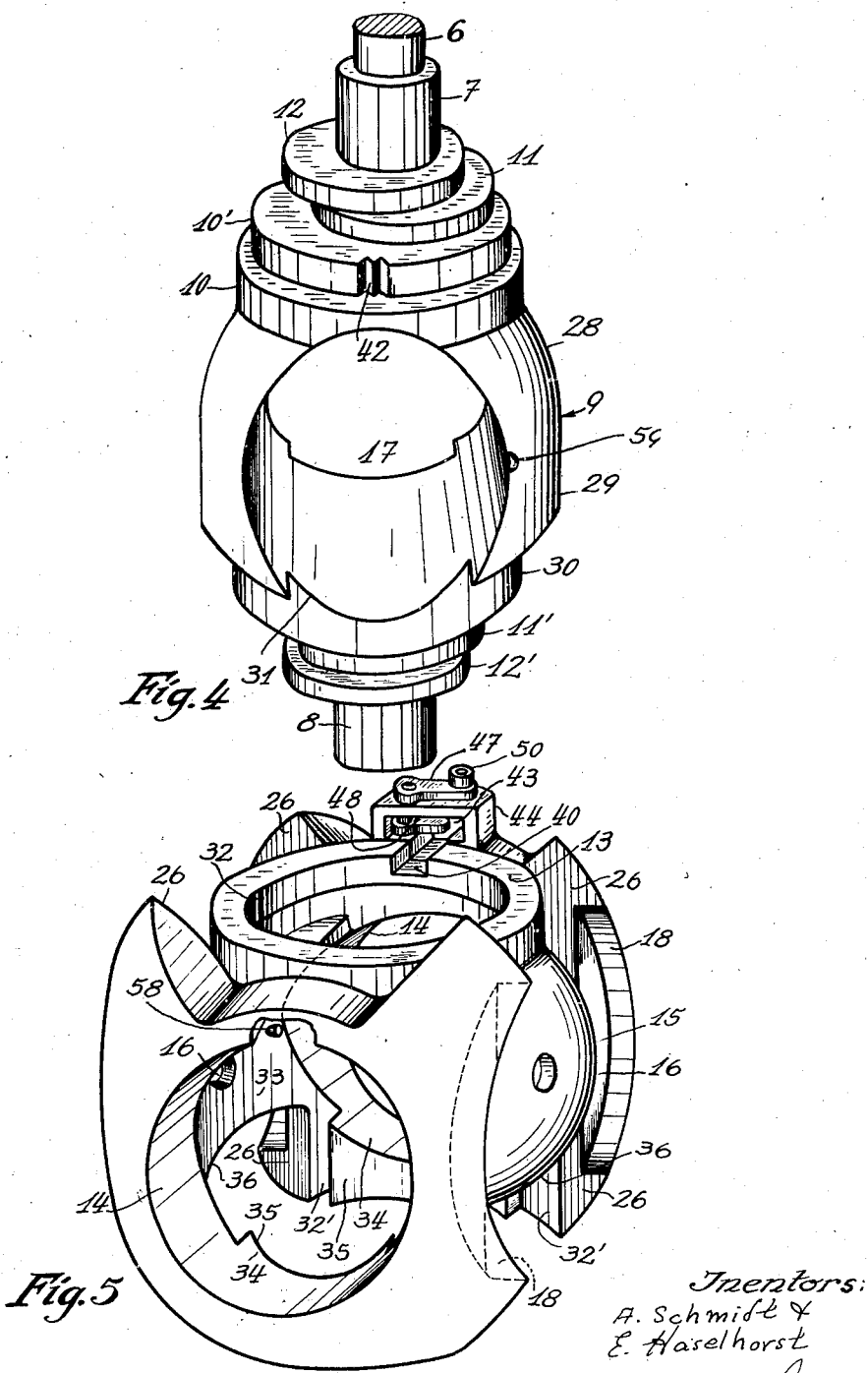

Patented May 5, 1931

1,803,773

UNITED STATES PATENT OFFICE

ALFRED SCHMIDT, OF DUSSELDORF, AND EWALD HASELHORST, OF HALLE-ON-THE-SAALE, GERMANY

ROTARY VALVE

Application filed August 9, 1929, Serial No. 384,690, and in Germany April 16, 1928.

This invention relates to a rotary valve for shutting off fluids, for instance steam, and more particularly to valves comprising a casing, a body which is rotatable in the said casing and has an opening extending through it, a rotatable spindle which carries the said body with it during a portion of its rotation and one or two valve plates which are capable of closing the opening extending through the casing.

One object of the invention is to provide a rotary valve of this kind which is simple to manufacture, easy to operate and reliable in operation.

Another object of the invention is to make the parts of the rotary valve so that they can be readily assembled and taken apart.

In the accompanying drawing Figure 1 is a vertical central section through the rotary valve in the half-open position, before the valve plates have been pressed against the inlet and outlet opening.

Figure 3 is a similar section through the rotary valve in the open position.

Figure 4 is a perspective view of the middle part of the spindle.

Figure 5 is a perspective view of the rotary body surrounding the spindle.

Figure 6 is a plan view of the parts arranged on the upper side of the rotary body, the said parts being shown in plan view, while the casing is shown in horizontal section through the central axis and the groove provided in the cover of the casing, which is not shown, is indicated by dot and dash lines.

Figure 7 shows diagrammatically some of the parts in Figure 6 in another position and Figure 8 is a perspective view to an enlarged scale of a detail of the arrangement shown in Figure 6.

Figure 1:
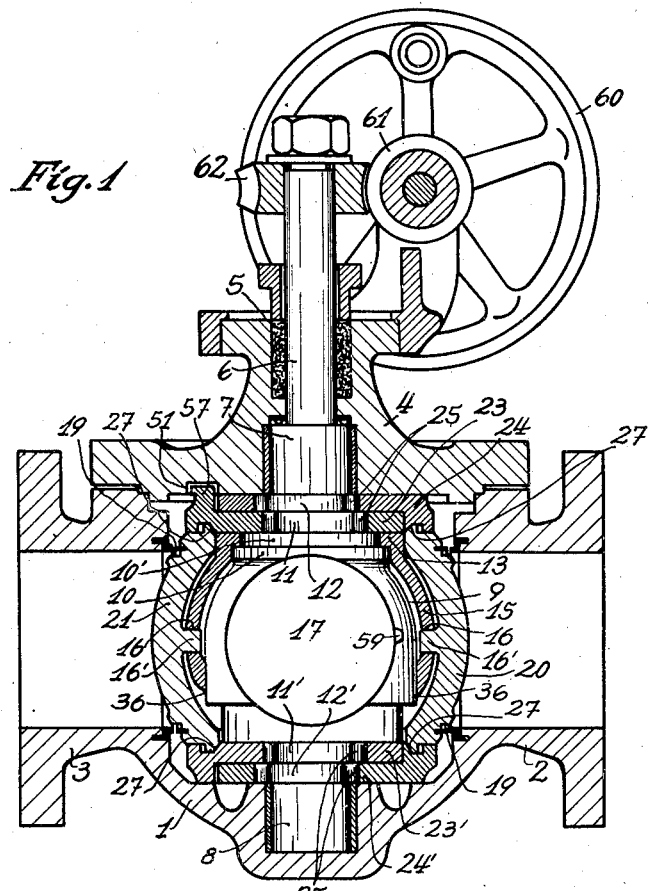

The casing 1 of the rotary valve which is cast in one piece with the branches 2 and 3 is turned out substantially spherically inside and is closed at the top by means of a cover 4 which is screwed on with screws not shown in the figure. Through a stuffing box 5 in the casing the valve spindle 6 extends, which is journalled in the cover and in the bottom of the casing with parts 7 and 8 of larger diameter and is enlarged in the middle of the casing to form a part 9 having an opening extending through it. The upper end of this part of the spindle has the form of a cylinder 10, the upper side of which at 10' is turned down to a smaller diameter so that the part 10 forms a shoulder. Above the part 10' two portions of the spindle are turned to form oppositely directed eccentrics 11 and 12. Symmetrically opposite these parts at the lower end of the middle part 9 of the spindle are two eccentrics 11' and 12'. All these parts are made integral with the spindle, but the whole may be built up of separate parts.

The middle spindle part 9 is surrounded by a body 15, the external surface of which is substantially spherical and fits into the spherical cavity in the casing 1, in which the body 15 is rotatable. The inside of the body 15 is turned out at the upper end in such a manner that it forms a ring 13 which fits on the cylindrical parts 10 and 10' of the spindle and rests on the shoulder formed by the cylindrical part 10. The spindle is capable of turning in the body 15.

The wall of the body 15 has two oppositely disposed bores 14 of the same diameter as the bore 17 of the part 9 of the spindle. These bores also have the same diameter as the bores of the branches 2 and 3 so that the bores of the parts 9 and 15, when in alignment with the branches 2 and 3 (Fig. 3), form an unbroken passage. In the position shown in Figure 2, which represents the rotary valve in an intermediate position between complete closing and opening, the parts 9 and 15 are so turned that the passage is closed. In order to pass from the closed position to the open position of Figure 3, the spindle 6 must be turned through about 180°. During the first part of this rotary motion the body 15 remains stationary and the spindle 6 turns relatively to this body, the parts moving into the position shown in Figure 2. During the last part of this rotary motion the spindle 6 carries the body 15 round with it by means of a device to be described below, so that the body 15 turns through 90° passing from the position shown in Figure 2 into the open position of Figure 3.

On both sides of the body 15 are bores 16 and recesses 18 in which valve plates 20 and 21 are rotatable and radially displaceable, the said valve plates resting with their edges in the recesses 18 and engaging by means of bosses 16' in the bores 16, so that they are capable of turning and being radially displaced and, when the valve is closed, of being pressed with their sealing rings 19 against corresponding sealing rings at the periphery of the branches 2 and 3. These valve plates have the form of calottes, so that they adapt themselves to the spherical shape of the body 15 and have room in the spherical interior of the casing 1 in which the body 15 turns. Instead of the two valve plates shown a single valve plate only may be provided on one side of the body 15. For displacing the valve plates 20 and 21, plates 23 and 24 are provided which rest on the upper side of the cylinder 10' of the spindle and on the ring 13 of the body 15 and have round recesses for receiving the eccentrics 11 and 12 respectively of the spindle and further similar plates 23' and 24' which rest on the lower side of the body 15 and embrace the eccentrics 11' and 12'. The round recesses in these plates have a greater diameter than the eccentrics, in order that the inner plates 23 and 23' can be pushed over the outer eccentrics 12 and 12' on to the inner eccentrics 11 and 11'. The intermediate space between the recesses in the plates and the corresponding eccentrics is filled with rollers 25 or segments. These rollers or segments may be omitted if the inner eccentrics 11 and 11' and the recesses in the plates 23 and 23' are made of greater diameter than the outer eccentrics 12 and 12' and the recesses in the plates 24 and 24'.

The recesses 18 on the outside of the substantially spherical body 15 are cut out in the vertical direction and perpendicular to the axis of the bore 14 so that at their upper and lower ends guides are formed having oppositely disposed parallel walls 26 (Figure 5). Between the walls 26 the plates 23, 24, 23', 24' are guided (Figure 6) in such a manner that they always move together with the body 15 and are displaced radially with respect to it by the eccentrics 11, 12, 11', 12', when the body 15 is turned relatively to the spindle 6. The valve plates 20, 21 project with their upper and lower edges into the space between the walls 26 and each of the plates 23, 24, 23', 24' is cut out at its outer end in such a manner that it forms a claw 27 which embraces the edge of one of the valve plates 20, 21. The plates 23, 23' engage over the edge of the valve plate 21 and the plates 24, 24' over the edge of the valve plate 20 (Figure 1). When the plates are simultaneously displaced inwardly or outwardly by the eccentrics 11, 12, 11', 12', the valve plates take part in this motion. The width of the claws 27 is preferably made slightly greater than the thickness of the edge of the valve plates 20, 21, so that the latter have a slight amount of play in the claws 27. Owing to this play the valve plate lying at the outflow side will, on the valve being closed, be pressed by the steam pressure against its seat sooner than the valve plate on the inflow side. The inner walls of the claws 27 and the edges of the valve plate resting against these walls are bevelled (Figures 1 and 2) and the valve plates can slide somewhat, while they are being forced outwardly by the plates 23, 23', 24, 24'. The object of the last arrangement is that the two valve plates 20, 21 in their extreme positions will be pressed uniformly against their seatings.

In order that the substantially spherical body 15 may be made of a single piece and that this body may nevertheless be easily assembled with the spindle, the parts in question have the following form: the bored part 9 of the spindle 6 is bounded below the cylindrical part 10 by a hemispherical part 28. This hemispherical part merges below into a cylindrical part 9. The part 30 below the cylindrical part is of a smaller diameter than the part 29. The bore 17 extends through the parts 28, 29 and 30. Owing to the reduced diameter of the part 30 the lower edges of the bore 17 recede somewhat inwards at 31.

The rotary body 15, the external surface of which is substantially spherical, is turned out internally in such a manner that the part of the spindle above described fits exactly into it, that is the upper end 32 of its bore is cylindrical, while the upper half 33 of the middle part has the form of half a hollow sphere and the lower half 32' has substantially the form of a vertical hollow cylinder. Into this hollow cylinder two projections 34 project from the wall of the cylindrical bore 32', which projections fill the receding parts 31 of the bore of the spindle, resting with their inner surfaces 35 against the cylindrical part 30 of the spindle and forming a guide for the latter. It will be seen that these projections do not interfere with the relative rotation of the spindle 6 and the body 15, as during the rotation the lateral edges of the recesses 31 pass over the lateral edges of the projections 34.

It may also be stated that the cylindrical part of the spindle is turned to a smaller diameter 30 only for the purpose that the lower end of the spindle shall not strike against the valve plates 20 and 21.

As the outside of the body 15 is spherical, but the inside is cylindrical as to the lower half, owing to the thinness of the wall of the body 15 within the recesses 18, in which the valve plates 20, 21 rest, its inner surface and outer surface merge at the edge 36 (Figures 1 and 5). If the cylindrical part 29 were not turned down to a smaller diameter at 30, it would project below the edge 36 into the recesses 18, that is to say into the space which must be left free for the valve plates (Figure 1). If the thickness of the wall of the body 15 be made greater, it is not necessary for the spindle to be turned down at 30. In this case the edges of the bore 17 do not recede inwards at 31 and the edges of the bores 14 do not project inwards at 34.

The formation of the parts just described makes it easy to assemble them, the body 15 being first pushed in the position shown in Figure 3 from above over the spherical part 9 of the spindle, the valve plates 20 and 21 being then placed in the recesses 18 of the body 15, the plates 23, 24, 23', 24' being then pushed over the eccentrics 11, 12, 11', 12', until their claws 27 engage over the edges of the valve plates 20, 21, and the whole being finally inserted in the hollow space within the casing 1.

As already stated the spindle performs during each opening and closing of the valve approximately half a revolution and the body 15 with the valve plates and the plates 23, 24, 23', 24' a quarter of a revolution. For this purpose it is necessary that the body 15 shall during a portion of the rotary motion of the spindle 6 be locked to the latter and shall be freely rotatable during another portion of the rotary motion of the spindle. This is effected by the device described below and illustrated in Figures 2, 6, 7 and 8.

Since, when the valve is closed the spindle is not operatively connected to the body 15, means have to be provided for enabling the spindle to turn the body 15 to open the valve. In the constructional example illustrated, the said means comprise a stop 58 on the body 15 which engages in a groove 59 in the spindle 9, the relative positions of the stop and groove being such that in the position of the parts shown in Figure 2, the stop bears against the wall of the groove opposed to it. Thus, on the spindle 9 being turned clockwise from the position shown in Figure 2, it will carry the body 15 around with it. However, during anticlockwise rotation of the spindle the stop 58 is out of engagement with the spindle 9.

In a slot 40 in the ring 13 forming the upper end of the body 15 a locking member 41 is slidable, the inner end of which, provided with pointed projections, can be pushed forward into a correspondingly shaped recess 42 in the part 10' of the spindle. The outside end of the locking member 41 extends into a rectangular recess 43 in a block 44 which is fixed on the top of the body 15 next to the ring 13 by means of screws, not shown in the drawing, or may be made in one piece with the body 15. Through the upper side of the block 44 there extends a pin 46, on the upper end of which a lever 47 is fixed. On the lower end of the pin 46 inside the recess 43 is fixed a lever 48 which engages in a depression 49 on the upper side of the locking member 41. On the lever 47 being rocked in the counter-clockwise direction the locking member 41 is withdrawn into the slot 40. In the position shown in Figure 6 the locking member 41 is pushed forward and enters the recess 42 in the spindle 6 so that the body 15 is coupled with the spindle 6 and must take part in its rotary motion.

The locking member 41 is pushed forwards and backwards by means of a roller 50 mounted on the lever 47, which roller is guided in a groove 51 in the cover 4 shown by dot and dash lines in Fig. 6. This groove 51 extends over the greater part of its length concentrically with the spindle, while its extreme end 52 is curved outwards. In the position shown in Figure 6 the roller is in the concentric part of the groove 51 and the locking member 41 is therefore pushed forward into the slot 40 in the spindle 6. On the spindle being turned in the counter-clockwise direction out of the position shown in Figure 6, the body 15 is forced to turn with it, until after approximately a quarter of a revolution the roller 50 passes into the eccentric part 52 of the groove and the locking member 41 is thereby withdrawn out of the recess 42. The body 15 is by this means uncoupled from the spindle 6 and is at the same time prevented from continuing its rotary motion by the roller 50 striking against the end of the groove 51, 52. During any further rotation of the spindle the body 15 will thus not be carried round with it.

The groove 51 is extended in the clockwise direction by a groove 55 which is concentric with the axis. The grove 55 is however narrower than the groove 51 so that the two parts of the groove form a shoulder 56 in the neighbourhood of the middle of the branch 3. On the upper side of the plate 23 is a cam 57 which engages in the groove 55 (Figures 1, 6, 7).

The arrangement operates as follows:

Assuming that the rotary valve is open, the parts will be in the position shown in Figures 3 and 6, that is to say the axes of the bore 17, of the spindle 6 and of the bore 14 in the body 15 are in alignment with the axis of the branches 2 and 3, while the centre axis of the valve plates 20, 21 is at right angles to the latter axis. The roller 50 is in the concentric groove 51 and the spindle 6 is therefore coupled by the locking member 41 with the body 15.

When the rotary valve is to be closed, the spindle 6 is turned in the counter-clockwise direction, for instance by means of a hand wheel 60, a worm 61 and a wormwheel 62. As the spindle is coupled by the locking member 41 with the body 15, the latter will rotate with it and the eccentrics 11, 11′, 12, 12′ will therefore have no effect on the plates 23, 24, 23′, 24′ and the valve plates 20, 21. The cam 57 will move during this part of the rotary motion in the concentric groove 55 and the roller 50 will move in the concentric groove 51.

Figure 2:
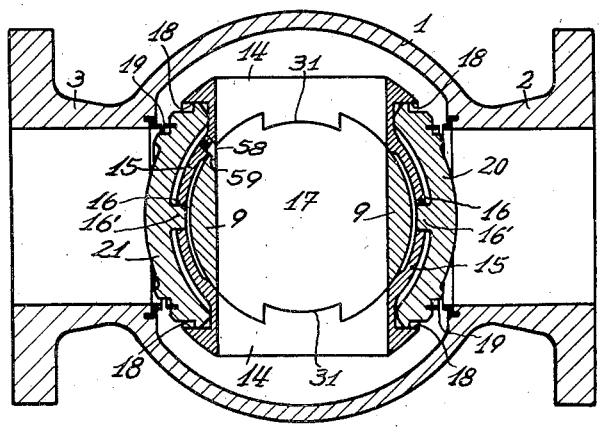
Figure 2 is a horizontal central section through the rotary valve in the same position as in Figure 1.

After the spindle has been turned through about 90° the roller 50 will run into the eccentric part 52 of the groove (Figure 7), whereby the locking member 41 is withdrawn in the manner already described and the body 15 uncoupled from the spindle 6. The body 15 is now in such a position that the valve plate 20 is opposite the branch 2 and the valve plate 21 opposite the branch 3 (Figure 2). The cam 57 will in the meantime have passed into the groove 51 and its upper edge will be opposite the shoulder 56.

As the roller 50 which is connected to the body 15 is now at the end of the groove 52 and prevents the body 15 from continuing to rotate, the spindle 6 will during its further rotary motion, turn relatively to the body 15 and the eccentrics 11, 12, 11′, 12′ mounted on the spindle 6 will commence to push the plates 23, 24, 23′, 24′, which are mounted on the body 15, outwards. By this means the valve plates 20, 21 are pressed on to their seats and at the same time the cam 57 on the plate 23 will move behind the shoulder 56 (Figure 7). The rotary valve is thus closed.

When the rotary valve is to be opened again, the spindle 6 is turned in the clockwise direction. The body 15 cannot take part in this rotary motion, as the cam 57 which is connected to it by the plate 23 is pushed forward behind the shoulder 56. Hence, there will in the first place be only a relative rotary motion between the spindle 6 and the body 15, the eccentrics 11, 12, 11′, 12′ drawing the plates 23, 24, 23′, 24′ and consequently the valve plates 20, 21 inwards. The cam 57 on the plate 23 is thus also caused to move inwards out of the range of action of the shoulder 56 (Figure 7), thus allowing the body 15 to turn freely. The parts are now in the position shown in Figure 2, the stop 58 being in engagement with the opposed wall of the groove 59. On the spindle 6 continuing to turn in the clockwise direction, the body 15 is caused to rotate with the spindle by the engagement of the stop 58 with the opposed wall of the groove 59. This causes the roller 50 to move out of the groove 52 into the groove 51, whereby the locking member 41 is pushed forward into the recess 42 in the spindle, so that the body 15 is coupled to the spindle 6. The two parts continue to turn together into the position shown in Figures 3 and 6 in which the valve is open. Any further turning is prevented by the cam 57 striking against the end of the groove 55.

Thus, during each opening or closing motion the spindle performs approximately a half revolution, while the body 15 with the valve plates and the plates 23, 24, 23′, 24′ perform a quarter revolution. In the open position the body 15 is locked to the spindle so that it is forced to turn with the spindle till it reaches the closed position. The last part of this rotary motion is utilized for disengaging the locking member, so that, at the moment of arriving in the closed position, the parts are uncoupled from one another and the spindle can continue to rotate, while the body 15 which is arrested by a stop remains stationary. Through the displacement of the valve plates towards the outside the body 15 is locked by the cam 57 to the casing 1, so that, when the spindle is subsequently turned back into the open position, the body 15 can only turn again together with the spindle, when the valve plates are withdrawn inwards, which is effected by approximately one quarter of a revolution of the spindle. At the commencement of the further quarter of a revolution of the spindle the body 15 will again be locked to the spindle, so that the spindle will carry the body 15 round into the open position.

What we claim is:

1. A rotary valve comprising a valve casing, inlet and outlet branches on the said casing, a bored valve spindle, a bored body surrounding the said spindle, valve plates on the said bored body, means for coupling the bored body with the spindle during a portion of the rotary motion of the spindle and for uncoupling it during another portion of the rotary motion, means for locking the rotary body to the valve casing during this latter portion of the revolution and eccentric parts on the spindle for causing the relative rotation of the spindle and rotary body to displace the said valve plates, as and for the purpose set forth.

2. A rotary valve comprising a valve casing, inlet and outlet branches on the said casing, a bored valve spindle, a bored body surrounding the said spindle, valve plates on the said bored body, means for coupling the bored body with the spindle during a portion of the rotary motion of the spindle and for uncoupling it during another portion of the rotary motion, means for locking the rotary body to the valve casing during this latter portion of the revolution, eccentric parts on the spindle for causing the relative rotation of the spindle and rotary body to displace the said valve plates, plates disposed above and below the rotary body on the said eccentric parts of the spindle and claws on the said plates for engaging over the edges of the valve plates, the eccentric parts being so positioned, that the displacement of the plates takes place simultaneously inwards and simultaneously outwards, as and for the purpose set forth.

3. A rotary valve as claimed in claim 2 and having a groove in the valve casing, a projection on the said plates capable of engaging in the said groove and a shoulder in the said groove for arresting the projection when the plates are displaced outwards, as and for the purpose set forth.

4. A rotary valve as claimed in claim 2 and having a groove in the valve casing, a locking member on the rotary body capable of being kept in engagement with one part of the said groove when the valve is in the open position and of being withdrawn by another part of the said groove during the closing of the valve, as and for the purpose set forth.

5. A rotary valve as claimed in claim 2 and having a groove in the vale casing, a mounting on the rotary member, a lever mechanism pivoted in the said mounting, a roller on the said lever mechanism capable of being guided in the said groove a locking member slidable in the said mounting and capable of engaging with the said lever mechanism, a groove in the valve spindle and a stop on the bored body adapted to engage said groove during another portion of the rotary motion, as and for the purpose set forth.

6. A rotary valve as claimed in claim 1 and in which the middle portion of the spindle comprises a hemispherical part and a cylindrical part, the rotary body is so formed internally as to fit over these parts of the spindle, the outside of the rotary body is substantially spherical and the part of the casing surrounding it is also substantially spherical, as and for the purpose set forth.

7. A rotary valve as claimed in claim 2 and in which the middle portion of the spindle comprises a hemispherical part and a cylindrical part, the rotary body is so formed internally as to fit over these parts of the spindle, the outside of the rotary body is substantially spherical and the part of the casing surrounding it is also substantially spherical, circular recesses on the outside of the rotary body and slots with parallel sides forming interruptions in the said circular recesses and capable of acting as guides for the said plates, as and for the purpose set forth.

In testimony whereof we have signed our names to this specification.

ALFRED SCHMIDT.
EWALD HASELHORST.